Nov. 28, 1939. J. W. LEIGHTON Re. 21,279
WHEEL ARM JOINT
Original Filed Nov. 18, 1933
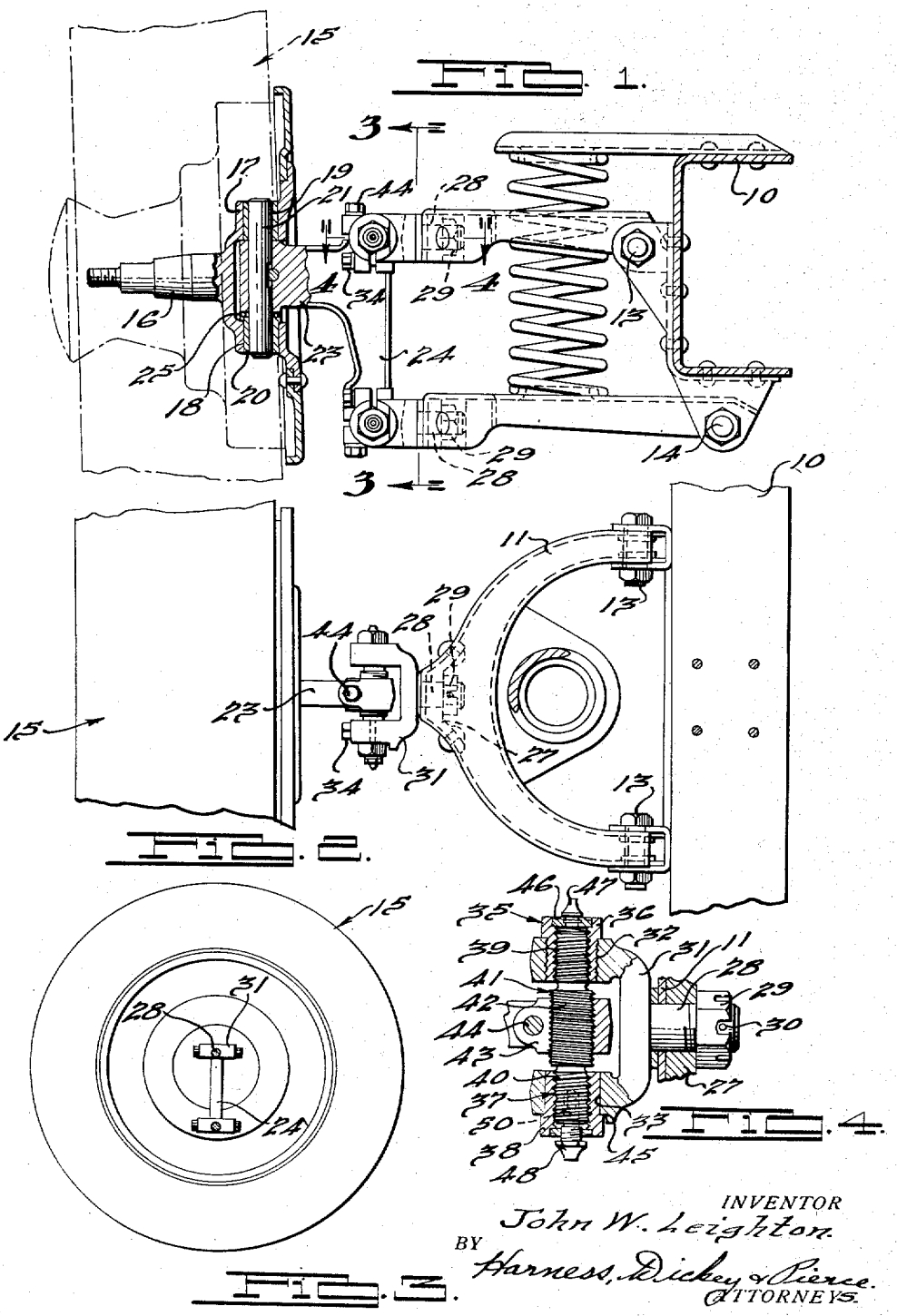
INVENTOR
John W. Leighton.
BY
Harness, Dickey & Pierce.
ATTORNEYS.

Reissued Nov. 28, 1939

Re. 21,279

UNITED STATES PATENT OFFICE 21,279

WHEEL ARM JOINT

John W. Leighton, Port Huron, Mich., assignor to The Manufacturers National Bank of Detroit, Detroit, Mich., a national banking association Original No. 2,123,088, dated July 5, 1938, Serial No. 107,536, October 26, 1936, which is a division of Serial No. 698,715, November 18, 1933, now Patent No. 2,123,086, dated July 5, 1938. Application for reissue March 27, 1939, Serial No. 264,471

5 Claims. (Cl. 287—100)

This invention relates generally to individually sprung wheels and it has particular relation to an adjustable joint connection for varying the castering angle of the front wheel.

This application is a division of application Serial No. 698,715, filed November 18, 1933, now Patent No. 2,123,086.

One object of the invention is to provide a joint for a front wheel of the individually sprung type which will enable adjusting the castering angle of the wheel very easily and very accurately.

Another object of the invention is to provide a joint for this purpose in which one part of the joint is journaled on the other by means of threaded bearing elements.

Another object of the invention is to provide a joint of this character between a wheel mounting and castering member and a link which will allow relative pivotal movement of the member and link in the plane of the latter, and also allow relative adjustment of the link and member transversely of said plane.

Other objects of the invention will become apparent from the following description taken in conjunction with the drawing and from the claims hereinafter set forth.

For a better understanding of the invention reference may be made to the drawing illustrating one form thereof, wherein:

Figure 1 is a fragmentary view of a motor vehicle having an individually sprung front wheel, illustrating a wheel mounting joint constructed according to one form of the invention;

Fig. 2 is a top plan view of the construction shown by Fig. 1;

Fig. 3 is a cross-sectional view on a smaller scale taken substantially along the line 3—3 of Fig. 1 and particularly illustrating the usual castering angle found in front wheel mountings;

Fig. 4 is a cross-sectional view on a larger scale taken substantially along the line 4—4 of Fig. 1.

Referring to Figs. 1 and 2, the frame of the vehicle is indicated at 10 and for mounting each of the front wheels on the frame in an individually sprung manner, upper and lower link members 11 and 12 are provided which, as best shown by Fig. 2, are of bifurcated character and are pivotally connected to the frame at vertically spaced points by means of pivots 13 and 14.

One of the front wheels is indicated at 15 and is rotatably mounted on a spindle 16 that may be integral with upper and lower bearing portions 17 and 18 that have sleeve bearings 19 and 20 therein respectively for receiving a king or pivot pin 21. The pin projects through a portion 23 of a mounting member 24 disposed between the bearing portions 17 and 18, and a thrust bearing 25 may be disposed between the lower sleeve bearing 18 and the portion 23. The wheel may turn on the pin 21 for steering purposes, and, as best shown by Fig. 3, the pin 21 and mounting member 24 will be tilted slightly to provide a castering angle.

Upper and lower ends of the mounting member 24 are pivotally connected to the free ends of the link members 11 and 12 so as to provide substantially a parallelogram linkage which will allow vertical movement of the wheel relative to the frame 10 without substantially changing the vertical plane of the wheel. The present invention is concerned principally with the pivotal connections between the free ends of the link members 11 and 12 and the upper and lower ends of the member 24 and particularly with an adjustable pivotal connection which will enable varying the castering angle or initially obtaining it.

Referring now to Fig. 4, the outer and base portion of the link member 11 has an apertured bracket plate 27 secured thereto and a stem 28 projects through the aperture to the inner side of the bracket where it is threaded into a nut 29. For preventing release of the nut, the latter may have openings for receiving a cotter pin 30 projecting through an opening in the threaded portion of the stem. At its outer end the stem is integral with a bifurcated arm 31 having one end provided with a threaded opening 32 and its other end formed with a split portion having a non-threaded opening 33. A clamping bolt 34 may be used to draw up the ends of the split portion for a purpose to be mentioned hereinafter. The threaded opening 32 receives a threaded bearing bushing 35 constructed of hard metal that has a hex portion 36 for turning the bushing as well as limiting its inward threaded movement. The opening 33 slidably receives a hard metal bushing 37 that has a hex head 38 thereon and once this bushing is in place it is prevented from turning by a projection 45 on the end of the arm 31 which extends along one face of the hex head as will be readily understood. Both of the bushings 35 and 37 are internally threaded alike for receiving threaded end portions 39 and 40 of a hard metal pivot pin 41 and the threads are fairly deep to provide a more efficient bearing engagement between the pin and bushings. The pitch and direction of the external threads on bushing 35 and in opening 32 are the same as that of the internal threads on the bushings and on the ends 39 and 40 of the pin, but are relatively shallow so as to obtain more of a wedging engagement between such external threads and the threads in the opening, that normally will prevent turning of the bushing after the hex head 36 engages the end of member 31 except when a wrench is applied. Between the ends of the bifurcated arm 31, the pin 41 is enlarged and threaded as indicated at 42 and in an opposite direction, and these threads are finer and have a greater pitch. This threaded portion of the pin is threaded through the upper end of the mounting member 24 and, as shown also by Fig. 1, such end of the mounting member has a threaded portion of clamping character indicated at 43 through which the threaded pin first may be threaded and then locked thereto by means of a bolt 44.

When the parts are assembled properly the clamping bolt 34 will tightly hold the bushing 37 in place and prevent any slight longitudinal play on the threaded end of the pin, and the bolt 44 will clamp the mounting member to the pin. The threaded engagement of the bushing 35 with the threaded opening 32 is sufficient to hold the bushing 35 in place and prevent turning thereof in the opening. Accordingly, a very positive lock is provided for preventing loosening of the parts of the joint while permitting relative turning of the mounting member and pin relative to the bushings.

The outer ends of the bushings 35 and 37 may be closed by means of Welch plugs 46 which may be apertured to receive great fittings 47 and 48. The fitting 47 may be welded or otherwise secured in place while the fitting 48 is threaded into the disc so as to permit its removal. The outer end of the threaded portion 40 of the pin has a socket 50 to permit inserting a suitable tool through the opening into which the fitting 48 is threaded and when the latter is removed, a suitable tool may be inserted to turn the pin.

In assembling the joint, the pin 41 may be inserted through the opening 32 and threaded through the mounting member 24 until the latter is approximately centered thereon, and then the bushing 37 may be threaded on the end portion 40 of the pin until the hex head 38 reaches the projection 39. Then the pin, member 24, and bushing may be moved so as to move the hex head slightly away from the projection 39 and the bushing turned again so as to approximately locate it in its normal position on the pin. Following this, the parts may be reversely moved so as to move the hex head 38 past projection 39 thereby locking the head and bushing against turning. Then the clamping bolt 44 is tightened and the bushing 35 is threaded into opening 32 and on the threaded end 39 of the pin until its head 35 engages the end of the portion 31. During threading of bushing 35 in this manner, slight longitudinal movement of one bushing may be required to match the internal threads of the bushing 35 with the threads on the pin, and in this event the bushing 37 may slide in opening 33. After the bushings are in place, the clamping bolt 34 is tightened, thereby positively locking the bushing 37 against play.

It would be practical to provide a similar joint between the lower link member and the lower end of the mounting member but ordinarily one adjustable connection will be sufficient to take care of the castering angle of the wheel. This adjustable connection might be located at either end but is located in the particular instance at the upper end of the mounting member. If only one adjustable connection is provided, it may be preferable to use the same joint in the other connection but to provide the pin with the same thread throughout its length and to clamp the end of the mounting member about the intermediate portion of the pin.

In adjusting the castering angle, the clamping bolt 44 is loosened, the nuts 29 loosened to permit stems 28 to turn and the fitting 48 is removed. A suitable tool then is inserted into engaging relation with the socket 50 and upon turning the tool, the pin 41 turns and owing to the thread on the ends of the pin being opposite as compared to the threads on the intermediate portions 42, a multiplied adjustment may be obtained by turning the pin only a small amount, and the mounting member 24 may be moved lengthwise of the pin a more pronounced distance. If the pin is turned clockwise as seen in Fig. 4, it will travel upwardly in the bushings and simultaneously the mounting member will travel upwardly on and relative to the pin thus multiplying the movement of the mounting member. Owing to the greater pitch of the central thread on the pin, an even more pronounced movement of the mounting member may be obtained so that a very slight turning of the pin may be all that is necessary to secure the proper adjustment. This is advantageous not only in making the usually fine adjustment required, but also in that only a small longitudinal travel of the pin is required from which it follows that the bearing bushings may be shorter and a smaller space may be provided between the ends of the pin and the grease fitting plugs. After making the adjustment, the fitting 48 is inserted and clamping bolt 44 and nuts 29 are again tightened which causes the parts to be firmly held in relative positions, although permitting oscillatory movement of the link members and mounting member.

Under certain circumstances, a multiplied movement of the mounting member might not be necessary and in this event, the threads 42 could be eliminated and the member clamped to the resulting smooth portion of the pin. In order to cause the member to move with the pin or maintain its axial position thereon during adjustment, integral collars could be provided on the pin at opposite sides of the mounting member or a pin could extend through the mounting member and into a circumferential surface groove in the pin. In either case, the pin 41 could be turned relative to the clamping member when the latter is released for making adjustments, while moving the member therewith.

The invention provides a simple and efficient joint connection in the individually sprung front wheel mounting for adjusting and obtaining the proper castering angle and furthermore, provides a joint which will allow pivotal movement of the link and mounting members and transverse adjustment thereof while insuring that the several parts of the joint will be positively held against loosening during operation of the vehicle. Also a joint is provided which does not require removal of any parts except one of the grease fittings in making adjustments, thereby simplifying the adjusting procedure. Additionally, it will be apparent that a multiplied movement of the castering member may be obtained which not only facilitates making adjustments and obtaining accuracy therein, but also reduces axial movement of the threaded pin which in turn enables using shorter bearing bushings.

Although only one form of the invention has been illustrated and described in detail, it will be apparent to those skilled in the art that various modifications may be made without departing from the scope of the appended claims.

What I claim is:

1. A pivotal and adjustable joint comprising a pair of members one of which has apertured and spaced arm portions and the other an apertured portion disposed between said arm portions, a pin extending through all of the apertures and having its opposite ends similarly threaded, thread means in the apertures in the arm portions for receiving the threaded ends of the pin, means on the pin for moving the other member therewith when the pin is turned and moved axially during adjustment, and means for releasably locking said other member to the pin for causing the latter to turn with said member during relatively pivotal movement of the members.

2. A joint comprising spaced arms having aligned apertures, a member disposed between the arms and having a threaded aperture in alignment with the first apertures, and a pin extending through all of the apertures and having threaded engagement with the aperture in one of the arms and also having its intermediate portion threaded in the aperture of the member, the threads on the intermediate portion of the pin being of a different pitch as compared to the threads on the end of the pin.

3. A joint comprising spaced arms having aligned apertures, a member disposed between the arms and having a threaded aperture in alignment with the apertures in the arms, and a pin extending through all the apertures and having threaded engagement with the aperture in one of the arms and also having an intermediate threaded portion threaded in the aperture of the member, the threads on the intermediate portion of the pin being directed oppositely to the threads on the end of the pin.

4. An oscillatory joint for automobiles comprising a pair of members having threaded openings, a bolt having threaded portions in engagement with the openings respectively, the threads on one portion of the bolt and in the opening therefor having a different pitch as compared to the threads on the other bolt portion and in the other opening, and means for clamping one member about the bolt portion engaging it, whereby the bolt will have threaded bearing relationship with the other member upon oscillatory movement between the members but upon temporarily loosening the clamp, the bolt may be turned to adjust the relative positions of the members on the bolt.

5. An oscillatory joint for automobiles comprising a pair of members having threaded openings, a bolt having threaded portions in engagement with the openings respectively, the threads on one portion of the bolt and in the opening therefor being directed oppositely and having a different pitch as compared to the threads on the other bolt portion and in the opening for the latter, and means for clamping one member about the bolt portion engaging it, whereby the bolt will have threaded bearing relationship with the other member upon oscillatory movement between the members but upon temporarily loosening the clamp, the bolt may be turned to adjust the relative positions of the members on the bolts.

JOHN W. LEIGHTON.